United States Patent
Grussmann et al.

(10) Patent No.: US 8,628,296 B2
(45) Date of Patent: Jan. 14, 2014

(54) EXHAUST-GAS TURBOCHARGER

(75) Inventors: Elmar Grussmann, Buke (DE);
Christian Smatloch, Paderborn (DE);
Lars Landermann, Herford (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 599 days.

(21) Appl. No.: 12/887,029

(22) Filed: Sep. 21, 2010

(65) Prior Publication Data
US 2011/0236191 A1    Sep. 29, 2011

(30) Foreign Application Priority Data
Sep. 22, 2009 (DE) .......................... 10 2009 042 260

(51) Int. Cl.
*F03B 11/02*    (2006.01)

(52) U.S. Cl.
USPC ....................................... 415/204; 415/215.1

(58) Field of Classification Search
USPC ....................... 415/202–206, 215.1
See application file for complete search history.

(56) References Cited

U.S. PATENT DOCUMENTS

| | | | |
|---|---|---|---|
| 6,553,762 B2* | 4/2003 | Loffler et al. | 60/605.1 |
| 7,074,009 B2* | 7/2006 | Allmang et al. | 415/177 |

FOREIGN PATENT DOCUMENTS

| | | | |
|---|---|---|---|
| DE | 42 00 611 A1 | 7/1993 | |
| DE | 197 21 092 C1 | 9/1998 | |
| DE | 100 22 052 | 3/2001 | |
| DE | 100 61 846 | 6/2002 | |
| DE | 10 2008 011 257 | 9/2009 | |
| EP | 1 357 278 A2 | 10/2003 | |
| JP | 2002004871 A * | 1/2002 | .............. F02B 39/00 |
| JP | 2002-349276 | 12/2002 | |
| JP | 2002-544449 | 12/2002 | |
| JP | 2003-293779 | 10/2003 | |
| JP | 2007-278130 | 10/2007 | |
| WO | WO 2009/106166 | 9/2009 | |

* cited by examiner

*Primary Examiner* — Edward Look
*Assistant Examiner* — William Grigos
(74) *Attorney, Agent, or Firm* — Henry M Feiereisen LLC

(57) ABSTRACT

An exhaust-gas turbocharger includes a bearing flange for securement of the exhaust-gas turbocharger to a bearing housing of a turbine wheel. The bearing flange is provided with an outer circumferential fin having a base portion which terminates in a free end. The base portion is defined by a width which is greater than a width of the free end. An outer housing is welded to the outer circumferential fin of the bearing flange, and accommodates an impeller housing.

21 Claims, 2 Drawing Sheets

EXHAUST-GAS TURBOCHARGER

CROSS-REFERENCES TO RELATED APPLICATIONS

This application claims the priority of German Patent Application, Serial No. 10 2009 042 260.9-13, filed Sep. 22, 2009, pursuant to 35 U.S.C. 119(a)-(d), the content of which is incorporated herein by reference in its entirety as if fully set forth herein.

BACKGROUND OF THE INVENTION

The present invention relates to an exhaust-gas turbocharger.

The following discussion of related art is provided to assist the reader in understanding the advantages of the invention, and is not to be construed as an admission that this related art is prior art to this invention.

Internal combustion engines for motor vehicles are increasingly charged by turbochargers to reduce fuel consumption. Fuel consumption is, however, also influenced by the weight of the exhaust system so that turbochargers should be as lightweight as possible but still be robust enough to withstand significant mechanical and in particular thermal stress during operation. Thermally induced stress has an essential influence on the service life of a turbocharger.

German Pat. No. DE 100 22 052 A1 proposes a decoupling of exhaust-conducting components and supporting and sealing outer structures. While the exhaust-conducting components of a turbocharger are exposed to such high thermal stress as to glow during operation, the thermal stress on the sealing outer structure is less. However, also the outer housing is subject to very high stress especially in the regions of attachment onto the bearing housing of a turbocharger. The outer system and outer housing of an exhaust-gas turbocharger normally includes shaped sheet-metal shells which are typically welded via a fusion-welded joint with a bearing flange that serves to secure the exhaust-gas turbocharger to a bearing housing of a turbine wheel. While the bearing housing is cooled to maintain support and thus also the bearing flange is cooled as a result of its contact with the bearing housing, a significant amount of heat is introduced via the outer housing into the bearing flange. The site of highest temperature gradient within the bearing flange is located in proximity of the joint line to the sheet-metal structure of the outer housing and inner housing of the exhaust-gas turbocharger. Geometry and material in particular of this region is weakened by the fusion-welding process, so that this region is subject to fatigue under extreme conditions.

It would therefore be desirable and advantageous to provide an improved exhaust-gas turbocharger to obviate prior art shortcomings.

SUMMARY OF THE INVENTION

According to one aspect of the present invention, an exhaust-gas turbocharger includes a bearing flange for securement of the exhaust-gas turbocharger to a bearing housing of a turbine wheel, with the bearing flange provided with an outer circumferential fin having a base portion terminating in a free end, wherein the base portion is defined by a width which is greater than a width of the free end, an outer housing welded to the outer circumferential fin of the bearing flange, and an impeller housing accommodated in the outer housing.

The present invention resolves prior art problems by providing the bearing flange on the outside with a wrap-around fin via which the outer housing is welded with the bearing flange. The fin has a base portion which is wider in relation to its free end. Widening the base portion enables a transfer of the amount of heat introduced via the outer housing via a wider cross sectional area into the solid base body of the bearing flange. The fin is thus intended to merge into the base body of the bearing flange in a quasi smooth or also essentially rounded manner. The change in cross section of the fin is advantageously continuous or has only small jumps to substantially avoid high temperature gradients.

According to another advantageous feature of the present invention, the fin has a wall thickness in a range from 0.9 to 1.3 of a wall thickness of the outer housing. The range relates hereby to the portions of the fin and the outer housing which are joined to one another. As a result, the wall thickness of the fin can be best suited to the wall thickness of the outer housing such that a fusion-welded joint results in a substantially even heat introduction into the fin and into the outer housing. By adjusting the wall thicknesses to one another, neither the fin nor the outer housing are excessively melted during fusion-welding. As a result of the wall thickness adjustment of the fin and the outer housing, the weld impact zones are adjusted, a fact that also contributes to an optimum heat transfer and to less material impairment of the weld joint. Fatigue caused by heat can thus be reduced.

According to another advantageous feature of the present invention, the width of the base portion can increase with increasing distance from the free end of the fin. As a result, a substantially even temperature gradient is realized. The increase is suitably continuous, which can be realized in particular by rounded transitions. It will be understood by persons skilled in the art that the present invention is not limited to the provision of rounded transitions but includes also configuration with several stepped transition zones so that the base portion incrementally widens towards the base body of the bearing flange. For manufacturing reasons, two to four steps may be sufficient.

The fin should be arranged circumferentially in the exhaust-gas turbocharger according to the invention on the outer side. Outer side is hereby to be understood as the radial outer side of the bearing flange. The fin is especially implemented by forming grooves on both sides of the fin. The outer housing is able to engage into the groove proximal to the inner impeller housing. In particular when the outer housing is made of sheet-metal shells, it is possible that a top shell and a bottom shell engage the groove in confronting relationship. The provision of the groove allows compensation of manufacturing tolerances. In addition, the outer housing is guided in the groove during the welding process.

In such an arrangement, the outer housing can rest against the fin in axial direction and be welded thereto. In this case, the fin and the bearing flange point at their connection zones in a radial direction of the bearing flange. The axial direction of the bearing flange coincides with the rotation axis of the turbine wheel of the turbocharger. The radial direction extends perpendicular to the axial direction.

When the fin and the outer housing point at their connection zones in axial direction, respectively, these connection zones abut one another like outer cylindrical surface areas. The connection zone of the fin extends in this case at a distance to the base body of the bearing flange. The fin includes therefore a connection zone which extends in radial direction and is angled in relation to the base portion, e.g. by 90°, although other angles are, of course, conceivable as well.

The base portion can have a rounded transition to the bearing flange. In the angled variation of the fin, the angle may be realized by shaping without material removal so as to provide in the transition zone from the base portion to the connection zone rounded transitions as well.

In the exhaust-gas turbocharger according to the invention, the inner impeller housing may be constructed as a separate component and connected with the bearing flange through material union, formfit or interference fit. In other words, the impeller housing may e.g. be collared, clamped, or welded with the bearing flange. It is, however, also possible to construct the impeller housing in one piece with the bearing flange. In this case, constructive reasons dictate the formation of the outer housing from a top shell and a bottom shell which are then placed over the inner impeller housing for welding with the fin which is arranged at a distance to the impeller housing.

Basically, it is advantageous to connect the impeller housing with the bearing flange at a distance to the outer housing. As a result, the amount of heat, introduced by the outer housing and the impeller housing into the bearing flange, can be dispersed so as to eliminate the presence of undesired high temperature gradients in the attachment zone with the bearing flange. In particular, heat is not directly transferred from the inner system to the outer housing and from there into the bearing flange via the welding impact zone.

According to another advantageous feature of the present invention, the fin can be connected with the outer casing by a weld seam in the form of a fillet weld either on the end face of the fin or on the end face of the outer housing. When the connection zones of the outer housing and the bearing flange respectively point in radial direction, it is suitable to weld the radially oriented end face of the fin with an outer side of the outer housing. In the other case, in which the fin and the outer housing have connection zones pointing in axial direction of the bearing flange, it is suitable to weld the end face of the outer housing to a fin outer side which in this case extends circumferentially radially on the outside.

As a result of an exhaust-gas turbocharger according to the invention, the outer housing can be reliably positioned in a groove next to the fin. Manufacturing tolerances can be compensated. Realization of an even, high-quality joining process with little heat introduction is possible, which is feasible by the connection of wall thicknesses which are substantially the same, whereby the wall thicknesses should not deviate by more than 10-30%. The decrease in stress peaks improves service life. Finally, joining the outer housing in the outer region of the bearing flange is generally beneficial because residues, especially weld spatter, caused by the joining process, cannot migrate into the interior of the turbine housing.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
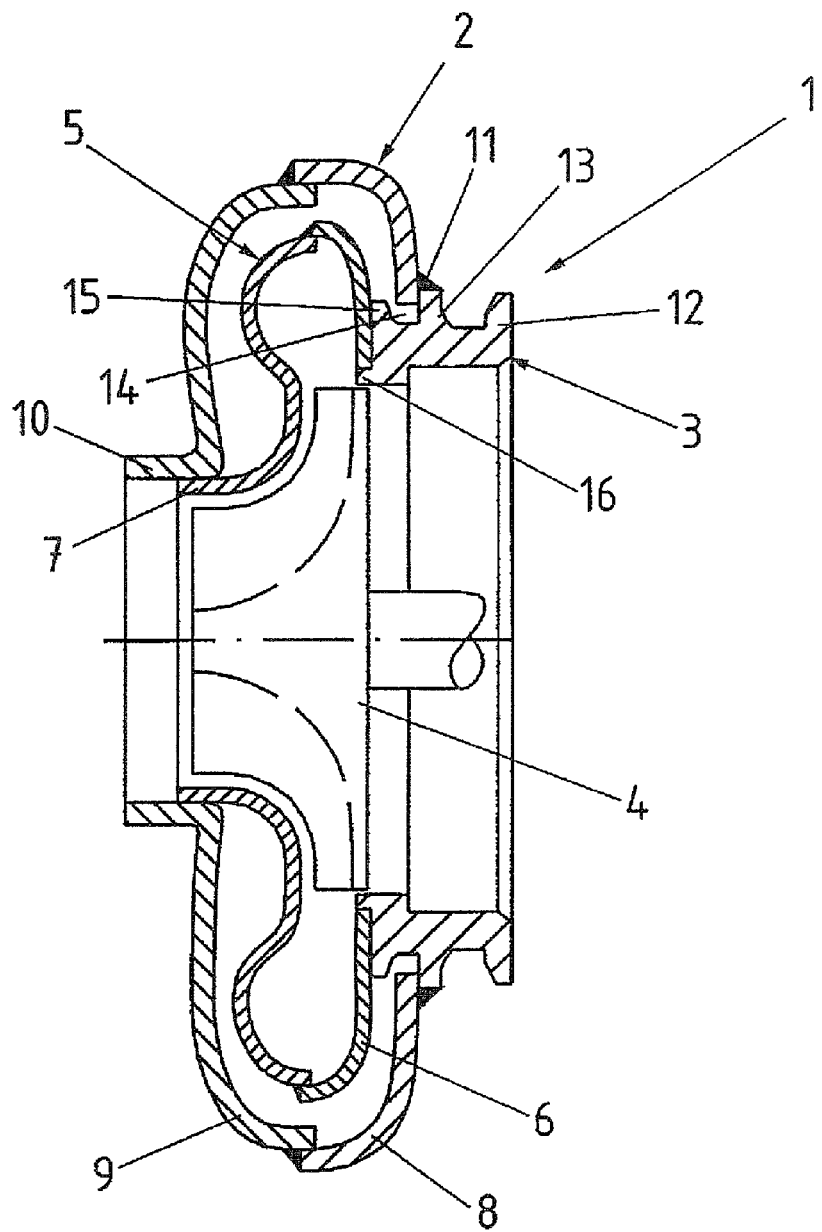
FIG. 1 shows a cross section through a turbine housing of an exhaust-gas turbocharger in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cross section through a turbine housing, generally designated by reference numeral 1, of an exhaust-gas turbocharger in accordance with the present invention. The turbine housing 1 includes an outer housing 2 which is welded with a bearing flange 3. The bearing flange 3 is provided for securement of the exhaust-gas turbocharger to a bearing housing which is not shown in greater detail and in which a turbine wheel 4 is supported.

The outer housing 2 bounds a gastight interior space. An inner impeller housing 5 is accommodated within the outer housing 2 and is formed of two sheet-metal shells 6, 7 which are welded to one another at the outer circumference of the impeller housing 5. Also the outer housing 2 includes two sheet-metal shells 8, 9 which in this exemplary embodiment are also welded to one another. The sheet-metal shell 7 of the impeller housing 5 on the left-hand side of the drawing plane engages a neck 10 of the sheet-metal shell 9 of the outer housing 2. The other sheet-metal shells 6, 8 of the outer housing 2 and the impeller housing 5, respectively, face the bearing flange 3 and are connected with the bearing flange 3.

Figure 2:
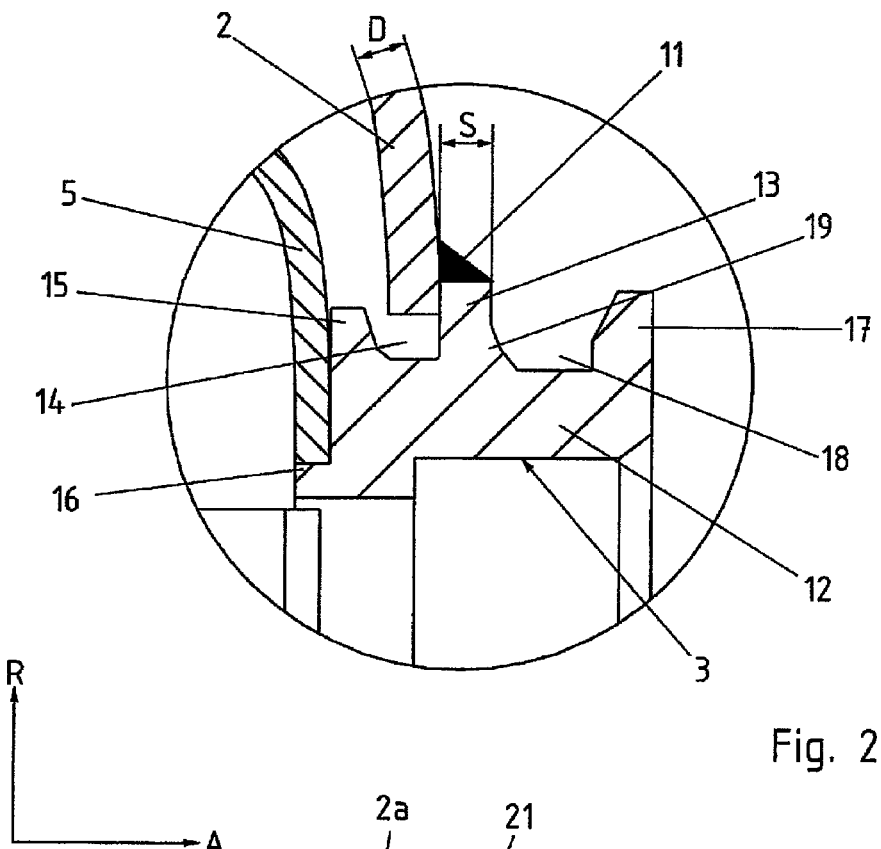
FIG. 2 shows an enlarged detailed view of the turbine housing in an area of an attachment zone between the outer housing and a bearing flange.

The sheet-metal shell 8 is welded via a weld seam 11 with a fin 13 which projects in radial direction in relation to a base body 12 of the bearing flange 3. A groove 14 is arranged anteriorly of the fin 13 in direction of the impeller housing 5 and in turn is followed by a collar 15 on which the fascia of the sheet-metal shell 6 of the impeller housing 5 rests, i.e. in axial direction. The sheet-metal shell 6 embraces in this exemplary embodiment radially on the outside a protrusion 16 which projects in axial direction. Details of this connection are shown in FIG. 2.

The fin 13 extends in radial direction R beyond the base body 12 which is significantly wider in axial direction A. The base body 12 is of solid construction because the outer housing 2 and the impeller housing 5 are connected to the bearing housing via the base body 12. The base body 12 has appropriate attachment zones for securement of the bearing flange 3 to the bearing housing. For that purpose, a radially projecting collar 17 is provided on the bearing housing of the bearing flange 3. The collar 17 is followed by a radial circumferential recess for formation of a groove 18 which is followed by the fin 13. The fin 13 is thus located between both grooves 14, 18 which are bounded in axial direction by both outer collars 15, 17. As a result, a substantial W-shaped outer contour is realized in cross section.

The fin 13, arranged substantially in midsection of the base body 12 of the bearing flange 3, has a wider base portion 19. The wider base portion 19 begins approximately at half the radial height of the fin 13. The widening increases in direction of the bearing-housing-proximal groove 18 in two increments. While the flanks of the free end of the fin 13 extend parallel to one another, the base portion 19 has a flank disposed in confronting relation to the groove 18 and having a first height section at a first inclination and a second lower (radially inwardly) height section at a second inclination, wherein the second inclination is greater than the first one in relation to the axial direction. As a result, an arched shape is realized as a first approximation. The arched shape and thus the widening of the base portion 19 is provided on the bearing-housing-proximal flank of the fin 13 because this region is subjected to especially high thermal stress.

As a result of the weld seam 11 formed by the fusion-welding process, the upper free end of the fin 13 undergoes a change in structure. The free end of the fin 13 is located in the welding influence zone. In order to protect this weakened zone, in which high temperatures are introduced by the welded-on outer housing 2, against excessive temperature gradients, the base portion 19 of the fin 13 is widened. Heat introduced from the outer housing 2 is diverted in the direction of the cooled bearing housing side of the bearing flange 3, without generating excessive thermal stress.

The groove 14, bounded by the collar 15 and the fin 13, serves, on one hand, as a positioning aid during welding of the outer housing 2 with the bearing flange 3. In addition, manufacturing tolerances can be compensated by the groove 14. In the non-limiting example of FIGS. 1, 2, the outer housing 2 slightly engages the groove 14 and thus effectively behind the collar 15 which projects out in radial direction R. This is possible because the outer housing 2 and the sheet-metal shell 8, illustrated in FIG. 1, are in turn designed in two parts so that the components of the sheet-metal shell 8 can engage the groove 14 at different depths. When the sheet-metal shell 8 of the outer housing 2 is made of single-piece construction, the fin 13 provides the boundary of the groove 14 and serves as stop. The collar 15 is to be configured correspondingly shorter to enable assembly.

The temperature gradient can further be minimized by securing the impeller housing 5 to the bearing flange 3 at a distance to the outer housing 2. The distance is selected at a maximum. In addition, the contact zone of the impeller housing 5 with the base body 12 is fairly large, as can be seen from FIG. 2. As a result, the impeller housing 5 which is under significantly more intense thermal stress is able to carry off a correspondingly large amount of heat to the base body 12. Securement of the impeller housing 5 to the base body 12 may be realized through material union, formfit, or interference fit.

It is further considered beneficial, when the wall thickness S of the fin 13 ranges from 0.9 to 1.3 the wall thickness D of the outer housing 2. As a result, components of same thickness are welded together, thereby significantly simplifying the joining process. During fusion-welding, about the same amounts of heat are introduced into the components to be connected with one another so that more even welding influence zones are realized.

In the embodiment of FIG. 2, the outer housing 2 rests effectively axially on the inside upon the fin 13 so that the weld seam 11 is designed as fillet weld. The weld seam 11 extends in this exemplary embodiment virtually on the end face (=radially to the outside) of the fin 13.

Figure 3:
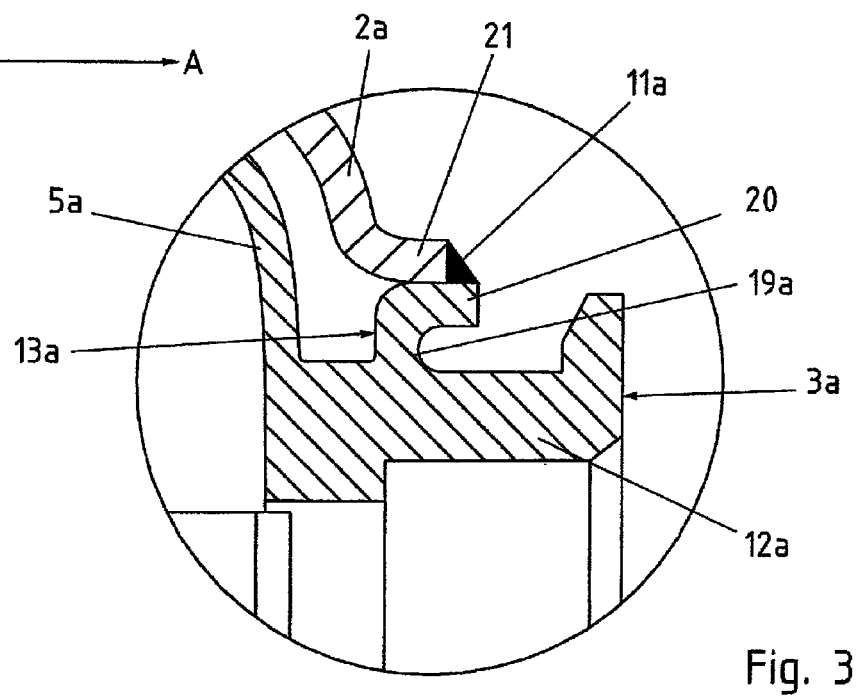
FIG. 3 shows an enlarged detailed view of a modification of the turbine housing in an area of an attachment zone between the outer housing and a bearing flange.

Referring now to FIG. 3, there is shown an enlarged detailed view of a modification of the turbine housing in an area of an attachment zone between outer housing and bearing flange. In the following description, parts corresponding with those in FIG. 2 will be identified, where appropriate for the understanding of the invention, by corresponding reference numerals followed by an "a". The bearing flange 3a is configured in one piece together with the impeller housing 5a. The outer housing 2a is welded with the fin 13a via a weld seam 11a. Also this fin 13a has a wider base portion 19a towards the base body 12a of the bearing flange 3a. In the embodiment of FIG. 3, the fin 13a has a connection zone 20 which extends relative to the base portion 19a at an angle of 90° in direction of the bearing housing side of the bearing flange 3a. The fin 13a and its connection zone 20 thus points in axial direction A as does a connection zone 21 of the outer housing 2a. The difference to the exemplary embodiment of FIG. 2 resides in the fact that the weld seam 11a is now located not at the end face, i.e. on the axial side of the fin 13a pointing towards the bearing housing, but rather on the end face of the connection zone 21 of the outer housing 2a so that the weld seam 11a is configured as fillet weld. The outer housing 2a is hereby slightly offset to the inside in direction of the impeller housing 5a. Like in the exemplary embodiment of FIG. 2, the wall thicknesses of the connection zones 20, 21 are approximately identical so that components of same thickness are welded together. As a result of the configuration of the base portion 19a with rounded transition towards the base body 12a of the bearing flange 3a, high temperature gradients can also be prevented in this embodiment.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An exhaust-gas turbocharger, comprising:
   a bearing flange for securement to a bearing housing of a turbine wheel, said bearing flange provided with an outer circumferential fin having a base portion terminating in a free end, wherein the base portion is defined by a width which is greater than a width of the free end, and wherein the base portion has a rounded transition towards the bearing flange;
   an outer housing welded to the outer circumferential fin of the bearing flange; and
   an impeller housing accommodated in the outer housing.

2. The exhaust-gas turbocharger of claim 1, wherein the width of the base portion increases with increasing distance from the free end of the fin.

3. The exhaust-gas turbocharger of claim 1, wherein the fin has a wall thickness in a range from 0.9 to 1.3 of a wall thickness of the outer housing.

4. The exhaust-gas turbocharger of claim 1, wherein the bearing flange has a first groove immediately adjacent to the fin for engagement of the outer housing.

5. The exhaust-gas turbocharger of claim 4, wherein the outer housing is formed of sheet-metal shells defining a top shell and a bottom shell, said top and bottom shells engaging the first groove in confronting relationship.

6. The exhaust-gas turbocharger of claim 1, wherein the fin is sized to project out in a radial direction of the bearing flange, said outer housing resting on the fin in an axial direction and welded thereto.

7. The exhaust-gas turbocharger of claim 1, wherein the base portion of the fin extends in a radial direction, with the connection zone extending at an angle to the base portion.

8. The exhaust-gas turbocharger of claim 7, wherein the angle is 90°.

9. The exhaust-gas turbocharger of claim 1, wherein the impeller housing is constructed in one piece with the bearing flange.

10. The exhaust-gas turbocharger of claim 1, wherein the fin is connected with the outer housing by a weld seam in the form of a fillet weld on an end face of the free end of the fin.

11. The exhaust-gas turbocharger of claim 1, wherein the fin is connected with the outer housing by a weld seam in the form of a fillet weld on an end face of the outer housing.

12. The exhaust-gas turbocharger of claim 4, wherein the bearing flange has a radially projecting first collar at a distance to the fin to thereby define a radial circumferential second groove there between so that the fin is positioned between the first and second grooves.

13. An exhaust-gas turbocharger, comprising:
a bearing flange for securement to a bearing housing of a turbine wheel, said bearing flange provided with an outer circumferential fin having a base portion terminating in a free end, wherein the base portion is defined by a width which is greater than a width of the free end, said bearing flange having a first groove immediately adjacent to the fin for engagement of the outer housing, a radially projecting first collar at a distance to the fin to thereby define a radial circumferential second groove there between so that the fin is positioned between the first and second grooves, and a second collar in spaced-apart relationship to the fin, with the first groove being defined there between so that the bearing flange has a substantial W-shaped outer contour;
an outer housing welded to the outer circumferential fin of the bearing flange; and
an impeller housing accommodated in the outer housing.

14. The exhaust-gas turbocharger of claim 13, wherein the fin and the outer housing are welded to one another in a connection zone which points in an axial direction of the bearing flange.

15. The exhaust-gas turbocharger of claim 13, wherein the width of the base portion increases with increasing distance from the free end of the fin.

16. The exhaust-gas turbocharger of claim 13, wherein the fin has a wall thickness in a range from 0.9 to 1.3 of a wall thickness of the outer housing.

17. The exhaust-gas turbocharger of claim 13, wherein the fin is sized to project out in a radial direction of the bearing flange, said outer housing resting on the fin in an axial direction and welded thereto.

18. The exhaust-gas turbocharger of claim 13, wherein the impeller housing is constructed in one piece with the bearing flange.

19. The exhaust-gas turbocharger of claim 13, wherein the fin is connected with the outer housing by a weld seam in the form of a fillet weld on an end face of the free end of the fin.

20. The exhaust-gas turbocharger of claim 13, wherein the fin is connected with the outer housing by a weld seam in the form of a fillet weld on an end face of the outer housing.

21. An exhaust-gas turbocharger, comprising:
a bearing flange for securement to a bearing housing of a turbine wheel, said bearing flange provided with an outer circumferential fin having a base portion terminating in a free end, wherein the base portion is defined by a width which is greater than a width of the free end said bearing flange having a first groove immediately adjacent to the fin for engagement of the outer housing and a radially projecting first collar at a distance to the fin to thereby define a radial circumferential second groove there between so that the fin is positioned between the first and second grooves wherein the width of the base portion increases in a direction of the second groove in two increments at different inclinations;
an outer housing welded to the outer circumferential fin of the bearing flange; and
an impeller housing accommodated in the outer housing.

* * * * *